(12) United States Patent
Virnig et al.

(10) Patent No.: US 6,432,167 B1
(45) Date of Patent: *Aug. 13, 2002

(54) PROCESSES FOR THE RECOVERY OF COPPER FROM AQUEOUS SOLUTIONS CONTAINING NITRATE IONS

(75) Inventors: Michael J. Virnig, Tucson, AZ (US); Phillip L. Mattison, Cincinnati, OH (US); Hans C. Hein, Santiago (CL)

(73) Assignee: Cognis Corporation, Gulph Mills, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/758,686

(22) Filed: Jan. 11, 2001

Related U.S. Application Data

(63) Continuation-in-part of application No. 09/349,574, filed on Jul. 8, 1999.

(51) Int. Cl.⁷ .............................. C22B 3/30; C22B 3/44
(52) U.S. Cl. .............................. 75/721; 75/740; 75/744; 423/23; 423/24; 423/27
(58) Field of Search .......................... 75/740, 744, 721; 423/23, 24, 27

(56) References Cited

U.S. PATENT DOCUMENTS

| | | |
|---|---|---|
| 3,224,873 A | 12/1965 | Swanson |
| 3,428,449 A | 2/1969 | Swanson |
| 3,950,488 A | 4/1976 | Skarbo et al. |
| 3,952,775 A | 4/1976 | Fisher |
| 4,020,105 A | 4/1977 | Ackerley et al. |
| 4,020,106 A | 4/1977 | Ackerley et al. |
| 4,029,704 A | 6/1977 | Anderson |
| 4,085,146 A | 4/1978 | Beswick |
| 4,173,616 A | 11/1979 | Koenders et al. |
| 4,197,117 A | 4/1980 | Pemsler et al. |
| 5,494,649 A | 2/1996 | Fristad et al. |
| 6,045,763 A * | 4/2000 | Kehl et al. ..................... 216/93 |

FOREIGN PATENT DOCUMENTS

GB          1 322 532          7/1973

OTHER PUBLICATIONS

Hawley's Condensed Chemical Dictionary, 12th edition, 1993, pp. 1058–1059 No month.

* cited by examiner

*Primary Examiner*—Roy King
*Assistant Examiner*—Tima McGuthry-Banks
(74) *Attorney, Agent, or Firm*—John E. Drach; Henry E. Millson, Jr.

(57) ABSTRACT

A process for the recovery of copper from an aqueous phase containing nitrate ions, in which the aqueous phase is contacted with a solution of an oxime extractant in a water-immiscible organic solvent, which comprises using at least one of the following process variants:

I) reducing the acidity of the aqueous phase prior to contact with the organic solution; and II) reducing the electromotive force in the aqueous phase prior to contact with the organic solution.

18 Claims, No Drawings

PROCESSES FOR THE RECOVERY OF COPPER FROM AQUEOUS SOLUTIONS CONTAINING NITRATE IONS

CROSS REFERENCE TO RELATED APPLICATIONS

This application is a continuation-in-part of application Ser. No. 091349,574, filed on Jul. 08, 1999.

FIELD OF THE INVENTION

This invention relates to the recovery of copper from copper ores.

BACKGROUND OF THE INVENTION

In processes for the recovery of copper from copper-containing ores in which copper is first extracted from the ores using an acid leach solution, followed by contacting the acid leach solution with organic solvent solutions containing oxime extractants, problems have been found with the processing of ores from certain locations such as ores from some areas of Chile. In particular, unacceptable degradation of the oximes has been found to occur, resulting in very high levels of oxime requirements per ton of copper produced from the ore, which of course results in a serious economic disadvantage.

SUMMARY OF THE INVENTION

Other than in the operating examples, or where otherwise indicated, all numbers expressing quantities of ingredients or reaction conditions used herein are to be understood as modified in all instances by the term "about".

It has been discovered that the copper ores that cause degradation of oxime extractants are those in which the ores contain concentrations of nitrate ions, which are taken up by the aqueous acid leach solutions. When organic water-immiscible solvent solutions containing oxime extractants come in contact with the nitrate-containing acid leach solution, especially those containing nitrate levels above 10 g/l, nitration and/or hydrolysis of the oximes has been found to take place, resulting in large losses of oxime extractants. In addition, buildup of the nitrated oximes, which become loaded with copper as a copper complex and which cannot be effectively stripped under commercial operating conditions, causes viscosity of the organic solvent solutions to increase to unacceptable levels, resulting in such problems as a lower net copper transfer to the organic phase, increased entrainment of the aqueous phase in the organic phase, increased entrainment of the organic phase in the aqueous phase, and precipitation of the nitrated oxime copper complex from the organic phase. In some instances, the above problems have resulted in oxime extractant consumption of about eight times the oxime consumption when aqueous acid leach solutions which do not contain nitrate ions are processed in an otherwise identical manner.

In investigating the above problems it was discovered that
a) the presence of oxime extractant modifiers and/or additives significantly increased the rate of oxime degradation;
b) the presence of large quantities of aldoximes in the oxime extractants significantly increased the rate of oxime degradation;
c) when the acidity of the aqueous phase in contact with the organic phase was reduced to a pH range of from 2.25 to 3.1 oxime degradation was significantly reduced; and
d) an electromotive force (EMF) of 650 mV or larger, as measured against an Ag/Ag Cl electrode, in the aqueous phase in contact with the oxime-containing organic solvent solution significantly increased oxime degradation.
e) other relationships between pH, EMF, and nitrate levels, described hereinafter.

Accordingly, the present invention relates to the following process variants, used individually or in combination, for reducing oxime extractant degradation from contact with the nitrate ion-containing aqueous phase in contact with the organic phase;

A) use of oxime extractants in water-immiscible organic solvent solutions wherein the solutions do not contain any modifiers or kinetic additives for the oxime extractants;

B) use of oxime extractants containing only ketoximes or a mixture of ketoximes and aldoximes in which the ketoxime:aldoxime molar ratio is less than 1:1.2, preferably less than 1:0.5, and more preferably 1:0.25 or less;

C) increasing the pH of the aqueous phase to a pH in the range of from 2.25 to 3.1 prior to contact with the oxime-containing organic solvent solution;

D) reducing the electromotive force in the aqueous phase to less than 650 mV before contact with the organic solvent oxime extractant solution (organic phase).

E) when the pH of the aqueous phase is at or above 0.95, and the $NO_3^-$ level is 32 g/l or less, the EMF can be above 650 mV, e.g. as high as 700 mV. However, when the EMF is greater than 700 mV, e.g. >700–800 mV, then (a) reduce the EMF to 700 mV or less, and/or (b) increase the pH to greater than 1.2, and/or (c) decrease the $NO_3^-$ level to 25 g/l or less prior to contact with the organic phase;

F) when the pH of the aqueous phase is lower than 0.95, e.g. from 0.5 to <0.95, then (a) the EMF must be, or be reduced to, less than 650 mV and/or (b) the $NO_3^-$ level must be, or be reduced to, less than 25 g/l, and/or increase the pH to 0.95 or greater prior to contact with the organic phase;

G) when the $NO_3^-$ level in the aqueous phase is greater than 32 g/l, e.g. >32–40 g/l or more, then (a) the pH is increased to 1.2 or more, and/or (b) the EMF is decreased to less than 650 mV, and/or (c) the $NO_3^-$ level is reduced to 25 g/l or less prior to contact with the organic phase;

H) when the $NO_3^-$ levels in the aqueous phase are, or are reduced to, 20 g/l or less, preferably 15 g/l or less, and more preferably 10 g/l or less, it is not necessary to control the pH or the EMF.

In the practice of the invention all EMF values and measurements are based on the Ag/Ag Cl electrode.

DESCRIPTION OF THE PREFERRED EMBODIMENTS

The solvent extraction process for extracting copper from copper ores typically involves the following steps:
1. Aqueous acid leaching of the copper ore using a strong acid to form an aqueous acid leach solution containing copper ions and often relatively small quantities of other metal ions. The aqueous leach acid solution dissolves salts of copper and other metals if present as it is contacted with the ore, e.g. as it trickles through the ore. The metal values are usually leached with aqueous sulfuric acid, producing a leach solution having a pH of 0.9 to 2.0.

2. The copper-pregnant aqueous acid leach solution is mixed in tanks with an oxime extraction reagent which is dissolved in a water-immiscible organic solvent, e.g., a kerosene or other hydrocarbons. The reagent includes the oxime extractant which selectively forms a metal-extractant complex with the copper ions in preference to ions of other metals. The step of forming the complex is called the extraction or loading stage of the solvent extraction process.

3. The outlet of the mixer tanks continuously feeds to a large settling tank or equivalent equipment, where the organic solvent (organic phase), now containing the copper-extractant complex in solution, is separated from the partially depleted aqueous acid leach solution (aqueous phase). This part of the process is called phase separation. Usually, the process of extraction is repeated through two or more mixer/settler stages, in order to more completely extract the copper.

4. After extraction, the partially depleted aqueous acid leach solution (raffinate) is either recycled for future leaching, or recycled with a bleed, or discharged.

5. The loaded organic phase containing the dissolved copper-extractant complex is fed to another set of mixer tanks, where it is mixed with an aqueous strip solution of concentrated sulfuric acid. The highly acid strip solution breaks apart the copper-extractant complex and permits the purified copper to pass and concentrate in the strip aqueous phase. This process of breaking the copper-extractant complex is called the stripping stage, and the stripping operation is repeated through two or more mixer-settler stages to more completely strip the copper from the organic phase.

6. As in the extraction process described above (step 2 and 3), the copper pregnant aqueous acid leach solution is fed to another settler tank for phase separation, or to another type of solvent extraction equipment that replaces the traditional mixer-settler.

7. From the stripping settler tank, the regenerated stripped organic phase is recycled to the extraction mixers to begin extraction again, and the copper is recovered from the strip aqueous phase, customarily by feeding the strip aqueous phase to an electrowinning tankhouse, where the copper metal values are deposited on plates by a process of electrodeposition.

8. After obtaining the copper values from the aqueous solution, the solution, known as spent electrolyte, is returned to the stripping mixers to begin stripping again.

The oxime extractants used in the above process are oxime extractants of the hydroxy aryl ketone oxime type or a mixture thereof with hydroxy aryl aldoximes. A general formula for such oximes is given on formula I shown below:

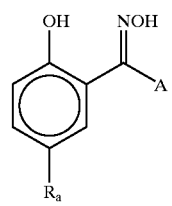

(I)

in which A can be:

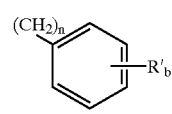

(i)

$R'''$ or (ii)

H (iii)

where R and R' can be individually alike or different and are saturated aliphatic groups of 1–25 carbon atoms, ethylenically unsaturated aliphatic groups of 3–25 carbon atoms or OR" where R" is a saturated or ethylenically unsaturated aliphatic group as defined; n is 0 or 1; a and b are each 0, 1, 2, 3, or 4, with the proviso that both are not 0 and the total number of carbon atoms in $R_a$ and $R'_b$ is from 3 to 25, R''' is a saturated aliphatic group of 1–25 carbon atoms or an ethylenically unsaturated aliphatic group of 3 to 25 carbon atoms, with the proviso that the total number of carbon atoms in $R_a$ and R''' is from 3–25. Preferred compounds where A is (i) above are those in which a is 1, b is 0, R is a straight or branched chain alkyl group having from 7 to 12 carbon atoms and where R is attached in a position para to the hydroxyl group. Among those, the more preferred compounds are those wherein R''' is methyl and R and a are as designated. Compounds wherein n has a value of 0 (i.e. hydroxybenzophenone oxime compounds) can be prepared according to methods disclosed in Swanson U.S. Pat. Nos. 3,952,775 and 3,428,449. By reason of ready solubility in organic diluents commonly employed in solvent extraction and desirable properties of complexes of the compounds with copper, preferred benzophenone compounds are those having a single alkyl group of 7–12 carbon atoms in a position para to the hydroxyl group, in which the alkyl group is a mixture of isomers. Examples of such compounds are 2-hydroxy-5-nonylbenzophenone oxime and 2-hydroxy-5-dodecylbenzophenone oxime, which are obtained as mixtures of the isomeric forms when commercial nonylphenol and dodecylphenol are respectively employed in their synthesis.

Compounds wherein n has a value of 1 (i.e. hydroxy phenyl benzyl ketone oxime compounds) can be prepared according to methods described in Anderson U.S. Pat. No. 4,029,704. Preferred phenyl benzyl ketone oximes like the above noted benzophenone oximes are those having an isomeric mixture of 7 to 12 carbon alkyl groups as a single substituent on the ring para to the hydroxyl group. These preferred compounds are exemplified by the compound, 2-hydroxy-5-nonylphenyl benzyl ketone oxime, as manufactured from a commercial nonylphenol comprising a mixture of nonyl isomeric forms.

Compounds of the hydroxy phenyl alkyl ketone oxime type can be prepared according to the procedures disclosed in UK Patent 1,322,532, and are especially preferred for use herein. As noted with regard to the benzophenone and phenyl benzyl ketone compounds described above, the preferred compounds of this type are also those having an isomeric mixture of 7 to 12 carbon alkyl groups as a single substituent on the ring para to the hydroxyl group. Also preferred are those in which the R''' alkyl group is methyl. Illustrative of such preferred compounds where A is $CH_3$ is 2-hydroxy-5-nonylphenyl methyl ketone oxime manufactured through the use of commercial nonylphenol.

Hydroxy aryl aldoxime extractants which can be employed in mixtures with ketoximes are those in which A is H. These hydroxy benzaldoximes, (also called "salicylaldoximes"), can be prepared according to methods described in Ackerley et al. U.S. Pat. Nos. 4,020,105 or 4,020,106 or by oximation of aldehydes prepared according to Beswick U.S. Pat. No. 4,085,146. Again preferred compounds are those having an isomeric mixture of isomeric 7 to 15 carbon alkyl groups as a single substituent para to the hydroxyl group, mixed alkyl isomeric forms of 2-hydroxy-5-heptyl benzaldoxime, 2-hydroxy-5-octyl benzaldoxime, 2-hydroxy-5-nonyl benzaldoxime and 2-hydroxy-5-dodecyl benzaldoxime are preferred, the most preferred for the purpose of the present invention where A is H is the dodecyl compound, i.e. 2-hydroxy-5-dodecyl benzaldoxime.

In one embodiment of the process of the present invention, the oxime extractant is either one or more ketoximes of formula (I) (i) or (I) (ii) or a mixture of one or more such ketoximes with one or more aldoximes of formula (I) (iii) above, in which the ketoxime:aldoxime molar ratio is less than 1:1.2, preferably less than 1:0.5, e.g. from 1:0.49 to 1:0.05, and more preferably is 1:0.25 or less.

The oxime extractants in the above process are typically used in prior processes in conjunction with modifiers such as one or more equilibrium modifiers, and kinetic active substances. Equilibrium modifiers include long chain aliphatic alcohols such an n-hexanol, 2-ethylhexanol, isodecanol, dodecanol, tridecanol, hexadecanol, and octadecanol; long chain alkylphenols such as heptylphenol, octylphenol, nonylphenol and dodecylphenol; organophosphorus compounds such as triloweralkyl ($C_4$ to $C_8$) phosphates, especially, tributyl phosphate and tri(2-ethylhexyl)phosphate; and either saturated or unsaturated aliphatic or aromatic-aliphatic esters containing from 10 to 30 carbon atoms, ketones, nitrates, ethers, amides, carbamates, carbonates, and the like. Kinetic active substances include $\alpha,\beta$-hydroxy oximes described in Swanson, U.S. Pat. No. 3,224,873 and $\alpha,\beta$-dioximes described in Koenders et al., U.S. Pat. No. 4,173,616.

In another embodiment of the invention, equilibrium modifiers and kinetic active substances are not used in the practice of the present invention, since they have been found to markedly increase the rate of oxime degradation from the nitrate ions.

In a further embodiment of the invention, it has been discovered that the addition of sodium sulfate ($Na_2SO_4$) to the copper-pregnant aqueous acid leach solution provides a buffering effect to increase the pH of the resulting raffinate obtained from the extraction of the copper-pregnant aqueous acid leach solution with the oxime extractant reagent dissolved in a water-immerscible organic solvent. The sodium sulfate is preferably added to the acid leach solution in a buffering-effective quantity, which is usually in the range of from 10 to 100 gpl, preferably from 10 to 50 gpl.

The water-immiscible organic solvents used in the solvent extraction process of the invention are usually water-immiscible liquid hydrocarbon solvents. These include aliphatic and aromatic hydrocarbon diluents such as kerosene, benzene, toluene, xylene and the like. A choice of essentially water-immiscible hydrocarbon solvents or mixtures thereof will depend on factors, including the plant design of the solvent extraction plant, (mixer-settler units, extractors) and the like. The preferred solvents for use in the present invention are the aliphatic or aromatic hydrocarbons having flash points of 130° Fahrenheit and higher, preferably at least 150° and solubilities in water of less than 0.1% by weight. The solvents are essentially chemically inert. Representative commercially available solvents are Chevron™ ion exchange solvent (available from Standard Oil of California) having a flash point of 195° Fahrenheit; Escaid™ 100 and 110 (available from Exxon-Europe) having a flash point of 180° Fahrenheit; Norpar™ 12 (available from Exxon-USA) with a flash point of 170° Fahrenheit; Conoco™ C1214 (available from Conoco) with a flash point of 160° Fahrenheit and C 170 exempt solvent having a flash point above 150° Fahrenheit; and Aromatic 150 (an aromatic kerosene available from Exxon-USA having a flash point of 150° Fahrenheit), and other various kerosene and petroleum fractions available from other oil companies, such as the ORFOM™ SX series of solvent extraction diluents (available from Phillips 66: SX 1, 7, 11 and 12 each having a flash point above 150° Fahrenheit varying up to 215° Fahrenheit); and ESCAID™ series of hydrocarbon diluents (available from Exxon: 100, 110, 115, 120, 200 and 300, each having a flash point above 150° Fahrenheit; and EXXOL™ D80 solvent (also available from Exxon and having a flash point above 150° Fahrenheit).

In the process, the volume ratios of organic to aqueous (O:A) phase will vary widely since the contacting of any quantity of the oxime organic solution with the copper containing aqueous solution will result in the extraction of copper values into the organic phase. For commercial practicality however, the organic (O) to aqueous (A) phase ratios for extraction are preferably in the range of about 50:1 to 1:50. It is desirable to maintain an effective O:A ratio of about 1:1 in the mixer unit by recycle of one of the streams. In the stripping step, the organic:aqueous stripping medium phase will preferably be in the range of about 1:4 to 20:1. For practical purposes, the extracting and stripping are normally conducted at or close to ambient temperatures and pressure although higher and lower temperatures and pressures are entirely operable although higher temperatures will increase oxime degradation. While the entire operation can be carried out as a batch operation, most advantageously the process is carried out continuously with the various streams or solutions being recycled to the various operations in the process for recovery of the copper metal, including the leaching, extraction and the stripping steps.

In the extraction process, the organic solvent solutions can contain the oxime extractant typically in an amount of about 2 to 35 weight/ volume %.

After stripping of the copper values from the organic phase by the aqueous stripping solution and separation of the organic and aqueous stripping phase, the copper metal can be recovered by conventional recovery processes, including, but not limited to, precipitation and electrowinning. Electrowinning is typically the preferred means of recovery of the copper from solutions suitable for electrowinning, generally highly acidic aqueous solutions, such as a sulfuric acid solution containing about 5 to about 200 g/l sulfuric acid, which is preferred as the aqueous acidic stripping solution to remove the copper values from the organic phase.

It is at this step, the stripping step, that the extraction reagent organic circuit phase which has degraded is removed from the extraction circuit after stripping for reoximation, prior to recovery of the metal from the stripping solution, with an optional scrub or wash step to remove any residual metals from the organic phase prior to reoximation and optional purification distillation where necessary or desirable.

Also, prior to stripping, it is not unusual to wash the organic phase, particularly where trace metals may be loaded on the organic extractant and/or aqueous phase is entrained in the organic phase. One or more wash stages may accordingly be employed depending on any trace metals present, the amount of entrainment and the required purity of the final copper loaded stripping solution.

In a further embodiment of the invention (variant C)), the acidity of the aqueous phase is reduced to a pH in the range of from 2.25 to 3.1, preferably from 2.25 to 2.7 prior to contact with the oxime-containing organic solvent solution. The acidity reduction can conveniently be carried out by adding a base to the aqueous phase, in which the base does not form an insoluble compound with the copper ions in the leach solution at a pH of 2.25 to 3.1. Sodium hydroxide is a preferred base for use herein. Other bases that can be used include sodium sulfate. Alternatively, acidity reduction can be carried out by contacting the aqueous phase with an acid-consuming oxidic copper ore.

In another embodiment of the process of the invention (variant D)), the electromotive force of the aqueous phase is reduced to less than 650 mV, preferably about 600 mV or less, as measured against an Ag/Ag Cl electrode, before contact with the oxime extractant-containing water-immiscible organic solvent solution in step 2. of the process. Various techniques can be employed to reduce the electromotive force. For example, the above aqueous phase can be passed over copper or iron metal, preferably scrap metal, or other divided forms of these metals, prior to step 2. of the process. Another method is to treat the above aqueous phase with sulfur dioxide prior to step 2. The above methods can also be combined, preferably by taking a portion of the aqueous phase, treating it with $SO_2$, contacting the resulting aqueous phase with copper or iron scrap metal for a period of about 15, e.g. 5 to 30 minutes, and then returning this portion of the aqueous phase to the remainder of the aqueous phase. The quantity of $SO_2$ added to the aqueous phase (based on the total quantity of aqueous phase) is not critical, and is generally in the range of 0.1 g. to 2 g. of $SO_2$ per liter of leach solution.

In further embodiments of the invention E) through H) when the $NO_3^-$ levels are reduced, this reduction can be accomplished by either (i), extracting the aqueous phase with a base, such as a tertiary alkylamine, e.g. ALAMINE® 336 (tricaprylyl amine), ALAMINE® 304-1 (trilaurylamine), ALAMINE® 308 (tri-isooctyl amine), ALAMINE® 310 (tri-isodecyl amine), ALAMINE® 300 (tri-n-octyl amine), and the like; (ii) removing the nitrate by treatment of the aqueous phase with a strong sulfuric acid solution, e.g. 200–400 g/l sulfuric acid, to convert the nitrate to nitric acid, and volatilizing the nitric acid by heating, e.g. 50° C. to 120° C.; or (iii) selectively removing the nitrate ions by passing the aqueous phase over a semipermeable membrane such as that used in the so-called HW process.

When the variants of the invention involve increasing the pH of the aqueous phase, this can be accomplished by treating the aqueous phase in accordance with the methods described above for variant C).

The invention will be illustrated but not limited by the following examples.

EXAMPLES

Example 1

400 Ml of an aqueous sulfuric acid leach solution having a pH of 1.75 was prepared containing 10 gpl Cu, 1.7 gpl ferric iron, 15 gpl chloride, and 32 gpl nitrate. 400 Ml of a kerosene (SX-12) containing 36.8 grams of 2-hydroxy-5-nonyl acetophenoneoxime was also prepared. The above acid leach solution and kerosene solution were placed in a one liter 3 neck round bottom flask fitted with a teflon paddle stirrer and a condenser. The temperature was controlled between 40° C. and 45° C. by immersing the flask in a temperature controlled water bath or by circulating heated water through a jacket around the flask. The solutions were mixed at 480 rpm and at the start of mixing the dispersion was aqueous continuous. Samples of the organic were removed at various times and analyzed for Cu max load as well as degradation products. A % total nitrated product was also determined for each organic using FTIR spectroscopy. Since the IR stretching bands for all of the nitro products of interest come at the same wavelength, IR cannot distinguish between nitro ketone, nitro phenol, and nitro ketoxime. Purified 2-nitro-5-nonylphenol was used as a standard to determine a total level of nitration for each organic sample, that is, the total amount of nitro ketoxime, nitro ketone and nitro phenol. The results are set forth in Table 1 below:

TABLE 1

| Days | % Ketone | % Nitration | Cu ML* (gpl) |
| --- | --- | --- | --- |
| 0 | 0 | 0 | 12.3 |
| 11 | 0 | 0 | 10.44 |
| 18 | 0 | 0 | 10.33 |
| 26 | 0 | 0 | 10.51 |
| 47 | 0 | 0 | 9.71 |
| 54 | 0 | 0 | 9.92 |
| 61 | 0 | 0.07 | 10.40 |
| 75 | 0 | 0 | 10.60 |
| 89 | 0 | 0.08 | 10.40 |

*ML = maximum load

As can be seen from the above results, essentially no hydrolysis or nitration of the ketoxime took place, even after 89 days of continuous contact.

Example 2

The process of Example 1 was repeated except that 39.2 grams of a mixture of 2-hydroxy-5-nonyl acetophenone oxime and 5-nonyl salicylaldoxime (0.85:1 molar ratio) was present in the kerosene instead of 36.8 grams of 2-hydroxy-5-nonyl acetophenoneoxime.

The results are set forth in Table 2 below:

TABLE 2

| Days | % Aldehyde | % Nitration | Cu ML (gpl) |
| --- | --- | --- | --- |
| 0 | 0.05 | 0 | — |
| 11 | 0.07 | 0.15 | 11.94 |
| 18 | 0.07 | 0.27 | 12.12 |
| 26 | 0.12 | 0.33 | 11.90 |
| 32 | 0.14 | 0.25 | 11.90 |
| 39 | 0.13 | 0.25 | 11.10 |
| 46 | 0.15 | 0.28 | 11.70 |
| 53 | 0.15 | 0.32 | 12.1 |

As can be seen from the above results, only very small quantities of the 5-nonyl salicylaldehyde were hydrolyzed or nitrated, even after 53 days.

Comparison Example 1

The process of Example 1 was repeated except that a mixture of 40.8 grams of 5-nonyl salicylaldoxime and 25.9 grams of 2,2,4-trimethylpentane-1,3-diol diisobutyrate was present in the kerosene instead of 36.8 grams of 2-hydroxy-5-nonyl acetophenoneoxime.

The results are set forth in Table 3 below:

TABLE 3

| Days | % Aldehyde | % Nitration | Cu ML (gpl) |
|---|---|---|---|
| 0 | 0.05 | 0 | — |
| 11 | 0.07 | 0.09 | 11.17 |
| 18 | 0.10 | 0.22 | 11.51 |
| 26 | 0.26 | 0.31 | 10.92 |
| 32 | 0.93 | 0.81 | 9.01 |
| 39 | 0.94 | 0.83 | 7.73 |

The above results show that a significantly higher hydrolysis to aldehyde occurs with the use of an aldoxime as the only oxime component in the presence of an ester modifier.

Comparison Example 2

The process of Example 1 was repeated except that a mixture of 40.8 grams 5-nonyl salicylaldoxime and 12.4 grams of tridecyl alcohol was present in the kerosene instead of 36.8 grams of 2-hydroxy-5-nonyl acetophenoneoxime.

The results are set forth in Table 4 below:

TABLE 4

| Days | % Aldehyde | % Nitration | Cu ML (gpl) |
|---|---|---|---|
| 0 | 0.05 | — | — |
| 11 | 0.15 | 0.23 | 12.41 |
| 18 | 0.21 | 0.53 | 12.28 |
| 26 | 1.44 | 4.43 | Precipitate |

The above results show that both hydrolysis to aldehyde and nitration levels are comparatively high after 26 days, and that in addition the high level of degradation is further shown by the fact that a precipitate is formed upon maximum loading of the organic with copper. The precipitate is due to high levels of the nitrated oxime. The precipitate is the copper complex of the 3-nitro-5-nonyl-salicylaldoxime.

Example 3

The process of Comparison Example 2 was repeated except that (a) the acid leach solution was contacted with copper metal shot for 30 minutes prior to its addition to the round bottom flask, and (b) the organic phase was a kerosene circuit organic phase from a Chilean copper SX plant in which the oxime component was a mixture of about 40.8 grams of 5-nonyl salicylaldoxime and about 12.4 grams of tridecanol, and about 6.7 grams of 2-hydroxy-5-nonyl acetophenoneoxime.

The results are set forth in Table 5 below:

TABLE 5

| Days | Cu ML (gpl) | Aq EMF* (mV) |
|---|---|---|
| 0 | 14.42 | 426.8 |
| 3 | 14.35 | 493.4 |
| 7 | 14.12 | 489.8 |
| 10 | 13.95 | 499.3 |
| 14 | 14.13 | 516.5 |
| 21 | 13.5 | 676.8 |
| 24 | 13.21 | 695.2 |
| 29 | 12.83 | 701.4 |

It can be seen from the above table that the maximum copper load remained fairly constant at electromotive forces between 426.8 and 516.5 mV. However, when the electromotive force rose between 676.8 and 701.4 mV, a significant drop in the maximum copper load resulted, showing that the degradation of the oxime extractants increased when the EMF increased.

Example 4

The process of Example 1 was repeated except that 39.2 grams of a mixture of 2-hydroxy-5-nonyl acetophenoneoxime and 5-nonyl salicylaldoxime (molar ratio 0.85:1) was employed instead of 36.8 grams of 2-hydroxy-5-nonyl acetophenoneoxime.

The results are set forth in Table 6 below:

TABLE 6

| Days | % Ketone and/or Aldehyde | % Nitration | Cu ML (gpl) |
|---|---|---|---|
| 2 | 0 | 0.09 | 11.9 |
| 5 | 0 | — | 11.6 |
| 12 | — | — | 11.5 |
| 20 | — | — | 9.97 |
| 26 | — | — | 9.49 |
| 33 | — | — | 9.19 |

It can be seen that the maximum copper load dropped somewhat over the course of 33 days.

Example 5

The process of Example 4 was repeated except that 42.5 grams of a mixture of 2-hydroxy-5-nonyl acetophenoneoxime and 5-dodecyl salicylaldoxime (0.85:1 molar ratio) were employed.

The results are set forth in Table 7 below:

TABLE 7

| Days | % Ketone and/or Aldehyde | % Nitration | Cu ML (gpl) |
|---|---|---|---|
| 2 | 0 | 0.10 | 11.1 |
| 5 | 0 | — | 11.0 |
| 12 | — | — | 10.9 |
| 20 | — | — | 10.1 |
| 26 | — | — | 10.6 |
| 33 | — | — | 10.6 |

It can be seen from the above table that while the maximum copper load dropped slightly over the course of 33 days, the drop was substantially less than that of Example 4, showing that an oxime mixture containing 5-dodecyl salicylaldoxime gives better results than an otherwise identical oxime mixture containing 5-nonyl salicylaldoxime.

Example 6

Three aqueous solutions consisting of 0.55 g/l Cu ions, 2 g/l Fe (III) ions, 32 g/l nitrate ions, 15 g/l chloride ions and 11.9 g/l sulfuric acid were prepared and the pH of each solution adjusted with $Na_2SO_4$ as shown in TABLE 8 below. The emf of these aqueous solutions was between 710–720 mV measured against an Ag/Ag Cl reference electrode.

TABLE 8

| Phase | Added $Na_2SO_4$ (gpl) | pH |
|---|---|---|
| 1 | 10.18 | 0.84 |
| 2 | 20.35 | 0.89 |
| 3 | 40.7 | 1.02 |

Three organic phases were prepared consisting of 22% (V/V) LIX® 84-I (92.1 g/l of 2-hydroxy-5-nonyl acetophenone oxime containing small quantities of 4-nonylphenol in kerosene (Philips SX-12 diluent)). The organic and aqueous phases were stirred together in a 3-neck 1 liter glass round bottom flask fitted with a TEFLON® paddle stirrer (75 mm) and cold water condenser fitted with a urethane foam plug to minimize loss of volatiles. All joints were fitted with TEFLON® sleeves or plugs to eliminate contamination by stopcock grease. The temperature of the contents of the flask was controlled by either circulating 45° C. water through a water jacket of flasks so equipped or by immersing the flask in an oil bath set at a temperature of 45° C. The agitator was maintained at 480 rpm and the emulsion was predominantly aqueous continuous.

Samples of the organic phases were removed after a week and analyzed for total nitration products.
The results are set forth in TABLE 9 below:

TABLE 9

| Phase | pH | % nitration/day |
|---|---|---|
| 1 | 0.84 | 0.162 |
| 2 | 0.89 | 0.110 |
| 3 | 1.02 | 0.025 |

It can be seen from the above table that increasing pH results in decreased total nitration products.

The organic phases were also analyzed for ketoxime, ketone, nitro ketone, 2-nitro-4-nonylphenol, nonyl phenol, and nitro ketoxime. It was found that at a pH of 1.02 only a small quantity of 2-nitro-4-nonylphenol and no nitro ketoxime were formed. At a pH less than 0.9, all of the 4-nonyl phenol was nitrated, together with some of the ketoxime.

Example 7

Three aqueous phases consisting of 0.5 gpl Cu, 1 gpl Fe, 0.95 gpl Mn (II), 140 gpl total sulfate, and sufficient sulfuric acid to give pH's of 0.7, 0.8 and 1.0 were prepared. The organic phase consisted of 17% (v/v) LIX 84-I (74.5 gpl of 2-hydroxy-5-nonylacetophenone oxime) in Phillips SX-12 diluent. The aqueous and organic phases were contacted as described in Example 6. The aqueous phase was replaced on a once per week basis. Samples of the organic were removed on a once per week basis and analyzed for copper max load. Samples of the aqueous phase were assayed for pH and emf. The results are summarized in Tables 10, 11 and 12. The copper maximum loading data shows that the oxime concentration remains constant during the course of the experiment even at a pH of 0.7. The fact that the strip point remains constant over this period of time indicates that no nitration of the oxime has occurred even at a pH of 0.7. If any significant amount of nitration had occurred, the strip point of the organic would have increased.

TABLE 10

Aqueous phase with pH = 1.0

| Time (days) | Cu Max Load (gpl) | Strip Point (gpl Cu) | Aq. Phase emf (mV) | Aq. Phase pH |
|---|---|---|---|---|
| 0 | 8.36 | 0.66 | 663 | 1.08 |
| 7 | 8.32 | 0.66 | 505 | — |
| 14 | 8.39 | 0.67 | 512 | — |
| 21 | 8.35 | 0.67 | 518 | — |
| 28 | 8.35 | 0.66 | 527 | 1.03 |
| 35 | 8.66 | 0.66 | 540 | 1.00 |
| 42 | 8.69 | 0.66 | 537 | 0.95 |
| 49 | 8.63 | 0.65 | 544 | 0.98 |
| 56 | 8.65 | 0.65 | 476 | 0.90 |

TABLE 11

Aqueous phase with pH = 0.8

| Time (days) | Cu Max Load (gpl) | Strip Point (gpl CU) | Aq. Phase emf (mV) | Aq. Phase pH |
|---|---|---|---|---|
| 0 | 8.36 | 0.66 | 662 | 0.80 |
| 7 | 8.38 | 0.67 | 524 | — |
| 14 | 8.37 | 0.67 | 524 | — |
| 21 | 8.40 | 0.66 | 526 | — |
| 28 | 8.39 | 0.65 | — | 0.75 |
| 35 | 8.42 | 0.64 | 526 | 0.98 |
| 42 | 8.49 | 0.64 | 535 | 0.70 |
| 49 | 8.39 | 0.64 | 663 | 0.74 |
| 56 | 8.41 | 0.64 | 540 | 0.67 |

TABLE 12

Aqueous phase with pH = 0.7

| Time (days) | Cu Max Load (gpl) | Strip Point (gpl CU) | Aq. Phase emf (mV) | Aq. Phase pH |
|---|---|---|---|---|
| 0 | 8.36 | 0.67 | 673 | 0.79 |
| 7 | 8.36 | 0.66 | 524 | — |
| 14 | 8.36 | 0.66 | 529 | — |
| 21 | 8.34 | 0.66 | 519 | — |
| 28 | 8.30 | 0.67 | 671 | 0.70 |
| 35 | 8.65 | 0.65 | 677 | 0.69 |
| 42 | 8.64 | 0.746 | 589 | 0.65 |
| 49 | 8.54 | 0.635 | 660 | 0.59 |
| 56 | 8.55 | — | 488 | 0.56 |

Example 8

The organic phase in Example 7 was replaced with one consisting of 17% (v/v) LIX® 984N (39.3 gpl 5-nonylsalicylaldoxime and 35.6 gpl 2-hydroxy-5-nonylacetophenone oxime) in Phillips SX-12 solvent. The experiments were carried out as described in example 7. The results are summarized in Tables 13, 14 and 15.

TABLE 13

Aqueous phase with pH = 1.0

| Time (days) | Cu Max Load (gpl) | Strip Point (gpl CU) | Aq. Phase emf (mV) | Aq. Phase pH |
|---|---|---|---|---|
| 0 | 9.03 | 2.40 | 649 | 1.04 |
| 7 | 8.95 | 2.37 | — | — |
| 14 | 8.87 | 2.35 | 507 | — |
| 21 | 8.82 | 2.33 | 509 | 1.04 |
| 28 | 8.91 | 2.34 | 512 | 0.98 |
| 35 | 8.97 | 2.35 | 511 | 1.0 |
| 42 | 8.95 | 2.46 | 515 | 0.85 |
| 49 | 8.93 | 2.44 | 476 | 0.87 |
| 56 | 8.94 | — | 477 | 0.88 |

TABLE 14

Aqueous phase with pH = 0.8

| Time (days) | Cu Max Load (gpl) | Strip Point (gpl CU) | Aq. Phase emf (mV) | Aq. Phase pH |
|---|---|---|---|---|
| 0 | 9.03 | 2.39 | 670 | 0.86 |
| 7 | 9.07 | 2.37 | 509 | — |
| 14 | 8.9 | 2.55 | 509 | — |
| 21 | 8.94 | 2.33 | 508 | 0.83 |
| 28 | 8.89 | 2.32 | 519 | 0.80 |
| 35 | 9.01 | 2.41 | 515 | 0.80 |
| 42 | 8.97 | 2.39 | 509 | 0.70 |
| 49 | 8.86 | 2.36 | 508 | 0.74 |
| 56 | 8.81 | 2.34 | 504 | 0.67 |

TABLE 15

Aqueous phase with pH = 0.7

| Time (days) | Cu Max Load (gpl) | Strip Point (gpl CU) | Aq. Phase emf (mV) | Aq. Phase pH |
|---|---|---|---|---|
| 0 | 9.03 | 2.44 | 674 | 0.76 |
| 7 | 8.95 | 2.39 | 520 | — |
| 14 | 8.83 | 2.33 | 514 | — |
| 21 | 8.85 | 2.32 | 512 | 0.73 |
| 28 | 8.79 | 2.32 | 521 | 0.69 |
| 35 | 9.12 | 2.39 | 514 | 0.70 |
| 42 | 9.04 | 2.34 | 508 | 0.66 |
| 49 | 9.02 | 2.25 | 490 | 0.68 |
| 56 | 8.98 | 2.27 | 492 | 0.62 |

The results are identical to those for LIX® 84-I in Example 7.

What is claimed is:

1. In a process for the recovery of copper from an aqueous phase containing nitrate ions, wherein the nitrate ions were extracted from copper ore containing nitrate ions and are the only source of nitrate ions in the aqueous phase, in which the aqueous phase is contacted with an organic solution comprising a solution of an oxime extractant in a water-immiscible organic solvent, the improvement comprising using at least one of the following process variants:
   I) reducing the acidity of the nitrate-containing aqueous phase; and
   II) reducing the electromotive force in said aqueous phase.

2. The process of claim 1 wherein process variant I is employed in the process.

3. The process of claim 1 wherein process variant II is employed in the process.

4. The process of claim 1 wherein the oxime extractant in the organic solution consists of oximes selected from the group consisting of at least one ketoxime and optionally at least one aldoxime wherein the ketoxime:aldoxime molar ratio is in the range of from 1:0 to about 1:1.2.

5. The process of claim 4 wherein the ketoxime:aldoxime molar ratio is in the range of from 1:0 to about 1:0.5.

6. The process of claim 4 wherein the oxime consists of at least one ketoxime.

7. The process of claim 4 wherein the oxime extractant consists of at least one hydroxy aryl ketone oxime.

8. The process of claim 4 wherein the ketoxime extractant is at least one hydroxy aryl ketone oxime, and the aldoxime is at least one hydroxy aryl aldoxime.

9. The process of claim 8 wherein the aldoxime is 2-hydroxy-5-dodecyl benzaldoxime.

10. The process of claim 3 wherein the pH in process variant I) is increased by the addition of sodium hydroxide to the aqueous phase.

11. The process of claim 2 wherein in process variant II the electromotive force is reduced by passing the aqueous phase over copper or iron metal and/or by adding sulfur dioxide to said leach solution.

12. The process of claim 1 wherein the organic solution does not contain any added modifiers or kinetic additives for the oxime extractant.

13. In a process for the recovery of copper from a copper-containing aqueous phase containing nitrate ions, in which the aqueous phase is contacted with an organic solution comprising a solution of an oxime extractant in a water-immiscible organic solvent, the improvement wherein the copper-containing aqueous phase is first buffered by adding thereto a buffering-effective quantity of sodium sulfate.

14. The process of claim 13 wherein said buffering-effective quantity is from about 10 to about 100 gpl.

15. In a process for the recovery of copper from an aqueous phase containing nitrate ions, in which the aqueous phase is contacted with an organic solution comprising a solution of an oxime extractant in a water-immiscible organic solvent, the improvement comprising:
   I) reducing the acidity of the nitrate-containing aqueous phase to a pH in the range of from about 2.25 to about 2.7;
   II) reducing the electromotive force in said aqueous phase to about 650 mV or less based on an Ag/Ag Cl electrode; and
   III) wherein the oxime extractant in the organic solution consists of oximes selected from the group consisting of at least one hydroxy aryl ketone oxime and, optionally, a hydroxy aryl aldoxime, wherein the ketoxime:aldoxime molar ratio is in the range of from 1:0 to about 1:1.2.

16. In a process for the recovery of copper from an aqueous phase containing nitrate ions, in which the aqueous phase is contacted with an organic solution comprising a solution of an oxime extractant in a water-immiscible organic solvent, wherein when the pH of the aqueous phase is at or above 0.95, the $NO_3^-$ level therein is 32 g/l or less, and the EMF is greater than 700 mV based on an Ag/Ag Cl electrode, the improvement comprising using one or more of the following procedures for the aqueous phase:
   (i) reducing the EMF to 700 mV or less,
   (ii) increasing the pH to greater than 1.2, and
   (iii) decreasing the $NO_3^-$ level to 25 g/l or less.

17. In a process for the recovery of copper from an aqueous phase containing nitrate ions, in which the aqueous phase is contacted with an organic solution comprising a solution of an oxime extractant in a water-immiscible organic solvent, wherein when the pH of the aqueous phase is less than 0.95, the improvement comprising using one or more of the following procedures for the aqueous phase:
   (i) reducing the EMF to less than 650 mV based on an Ag/Ag Cl electrode,
   (ii) increasing the pH to 0.95 or greater, and
   (iii) decreasing the $NO_3^-$ level to 25 g/l or less.

18. In a process for the recovery of copper from an aqueous phase containing nitrate ions, in which the aqueous phase is contacted with an organic solution comprising a solution of an oxime extractant in a water-immiscible organic solvent, wherein when the $NO_3^-$ level in the aqueous phase is greater than 32 g/l, the improvement comprising using one or more of the following procedures for the aqueous phase:
   (i) reducing the EMF to less than 650 mV based on an Ag/Ag Cl electrode,
   (ii) increasing the pH to at least 1.2, and
   (iii) decreasing the $NO_3^-$ level to 25 g/l or less.

* * * * *